United States Patent Office 3,367,735
Patented Feb. 6, 1968

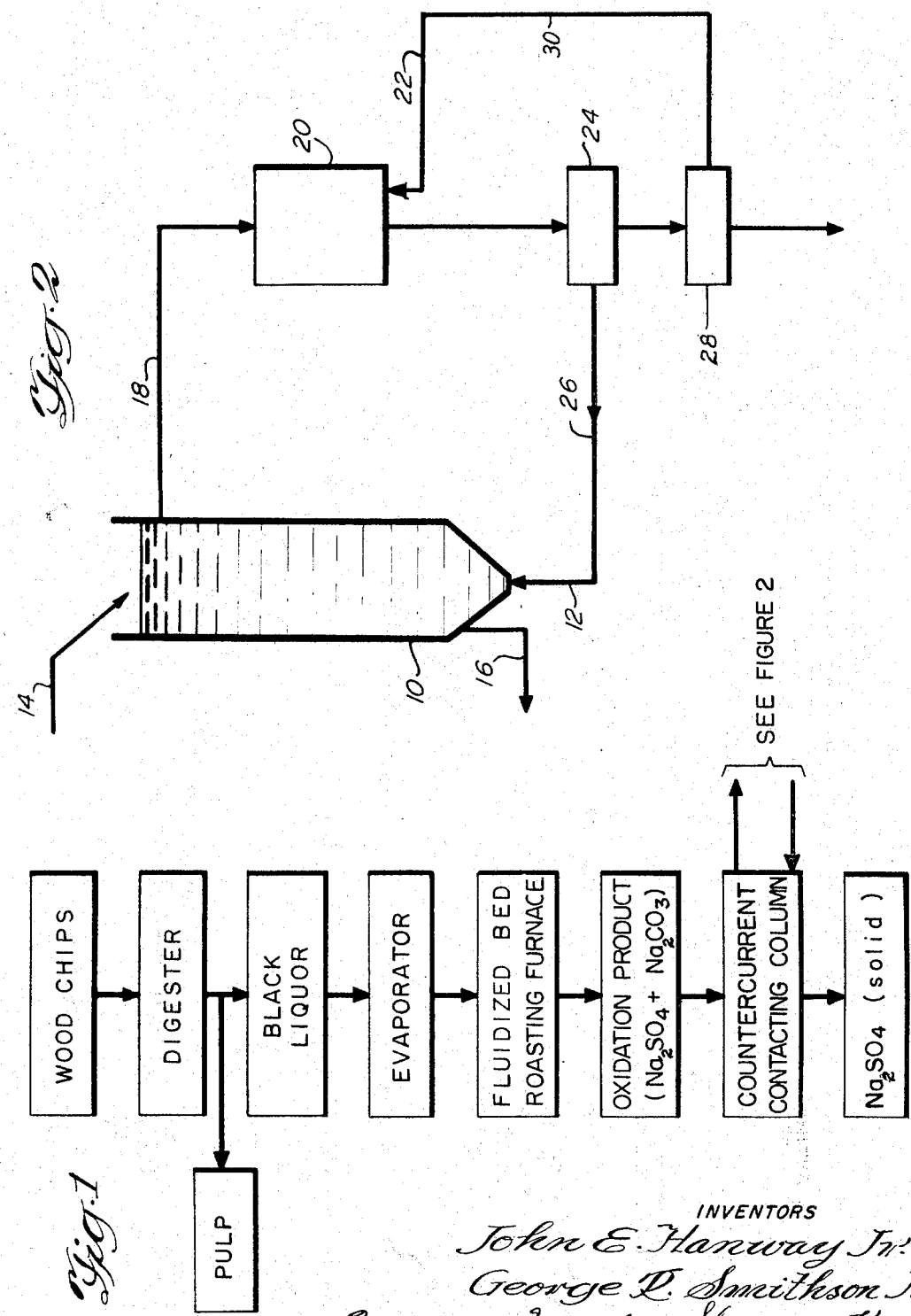

3,367,735
SEPARATION AND RECOVERY OF SODIUM SULFATE AND SODIUM CARBONATE FROM ADMIXTURES THEREOF
John E. Hanway, Jr., Columbus, and George R. Smithson, Jr., Grove City, Ohio, assignors to Container Corporation of America, Chicago, Ill., a corporation of Delaware and Copeland Process Corporation, Oak Brook, Ill., a corporation of Illinois
Filed Sept. 23, 1965, Ser. No. 489,576
4 Claims. (Cl. 23—48)

This invention relates to a process for the separation and recovery of sodium sulfate and sodium carbonate from an aqueous mixture thereof. In its more specific aspect, this invention relates to a process for the separation and recovery of sodium sulfate and sodium carbonate from spent cooking liquors used in producing pulp from wood.

In the neutral sulfite pulping process for producing wood pulp, wood chips are cooked or digested in a cooking liquor commonly referred to as "white liquor," which comprises bisulfite solution and sodium carbonate. The sodium carbonate acts as a buffer, and free sulfur dioxide is nearly completely eliminated or substantially decreased as compared with the acid sulfite pulping process. The spent cooking or digestion liquor is separated from the resulting pulp which is further refined or treated. In many conventional mill operations, any sulfur dioxide liberated from the blow pit of the digestion operation is recovered and used in subsequent digestion operations. However, it is difficult to regenerate the remaining spent liquor or to recover pulping chemicals therefrom, and in most cases the liquor is passed to waste. This results in a considerable economic loss, and further causes serious pollution problems.

The invention disclosed in pending application entitled "Fluidized Bed Oxidation of Waste Liquors" having Serial No. 459,267, now abandoned, to Copeland and Hanway, relates to the fluidized bed treatment of the spent liquors. According to that invention, spent or waste liquor from the wood pulping operations, which contains combustible organic matter, inorganic salts, and complex organo-salts, is introduced to a fluidized bed oxidation furnace. Combustion occurs in an oxidizing atmosphere whereby the organic matter is burned off leaving a granular product consisting essentially of the residual inorganic chemicals from the original spent liquor.

When spent liquor from the neutral sulfite pulping operation is treated in an oxidizing atmosphere, the resulting inorganic compounds of the granular product are comprised of essentially sodium sulfate and sodium carbonate. Recovery of a portion of these inorganic compounds is possible by first dissolving the product in water, and then carbonating the resulting aqueous solution to convert the sodium carbonate portion to sodium bicarbonate and to precipitate therefrom sodium bicarbonate. The recovered precipitate may be heated to convert the product to sodium carbonate. This results in the recovery of the sodium carbonate which can be used directly in the pulping operation and the sodium sulfate is provided as an essentially pure product which can then be used for paper or other operations.

This invention has as its purpose to provide a method for the separation and recovery of the sodium sulfate and sodium carbonate from an aqueous mixture thereof, and especially to provide for such a method applicable to spent cooking liquor used in the digestion of wood pulp.

In its broadest concept, our invention comprises a two-step operation which depends upon the mutual solubility of sodium carbonate and sodium sulfate and the limited relative solubility of sodium bicarbonate at the same temperature. In accordance with our invention, an aqueous mixture comprising sodium sulfate and sodium carbonate, which is saturated with respect to the sodium sulfate and unsaturated with respect to the sodium carbonate, is passed to a suitable contacting column, vessel, or the like. During the steps of the process, all solutions are at a temperature of from about 10 to 35° C. A second admixture comprising sodium sulfate and sodium carbonate is added to the aqueous mixture thereby selectively extracting the sodium carbonate from the addition. The sodium sulfate from the addition cannot go into solution because the initial aqueous admixture is saturated with respect to the sodium sulfate, and therefore the sodium sulfate forms a residue which is readily recovered. In the preferred embodiment of the invention, the second admixture of the sodium sulfate and sodium carbonate addition is a solid admixture, desirably the granular product obtained from the oxidation furnace, e.g., the fluidized bed furnace, when treating the waste liquor from the wood pulping operation. Thus, upon the addition of the granular solids product to the aqueous admixture, the sodium carbonate goes into solution and the sodium sulfate forms a residue which is removed from the aqueous admixture.

The resulting aqueous mixture comprising a saturated solution with respect both to sodium sulfate and to sodium carbonate is passed to a carbonation tower. At this point, carbon dioxide gas is pumped through the tower and contacted with the aqueous mixture whereby substantially all the sodium carbonate is converted to sodium bicarbonate. The sodium bicarbonate formed is relatively insoluble and a substantial portion will precipitate from solution. The solution may be passed through a suitable filter, such as a rotary filter, to remove the precipitated sodium bicarbonate.

The mother liquor, saturated with respect to sodium sulfate and also now containing sodium bicarbonate, is recycled to the contacting column for additional separation and recovery of the sodium carbonate and sodium sulfate. The sodium sulfate residue is relatively pure, and may be recovered for further valuable uses. The sodium bicarbonate recovered from the filtering step may be passed to a suitable drying oven where the sodium bicarbonate is heated and converted to sodium carbonate. The carbon dioxide liberated during the conversion of the bicarbonate to carbonate may be recycled for use in the carbonation tower for the carbonation of subsequent solutions. The sodium carbonate may be recycled for use as the buffer in subsequent neutral sulfite pulp digestion operations. Where desired, a portion, or all of the sodium carbonate may be treated with sulfur dioxide in a known manner to produce an acid sulfite solution for use in subsequent pulping digestion operations.

The aqueous admixtures treated in accordance with the invention are maintained at a temperature of from about 10 to 35° C., and more preferably from about 22 to 30° C. At temperatures below about 10° C., the relative solubilities of sodium carbonate and sodium bicarbonate are such that the proportion of original sodium carbonate which will precipitate as insoluble sodium bicarbonate is so small as to require extensive recycle of solutions thereby rendering the process uneconomical. On the other hand, temperatures in excess of about 35° C. are impractical because of the crystallization problems encountered due to greater loss of water caused by the higher vapor pressure at elevated temperatures thereby making the handling of these solutions exceedingly difficult and impractical. Also, the sodium bicarbonate precipitate formed in solutions outside the limits of the expressed temperature range, and especially the more narrow range, tends to be fine and is difficult to filter, dewater, and wash.

In order to describe the invention in greater detail, reference is now made to the preferred embodiment and to FIGURE 1, which constitutes a flow sheet of the process of the present invention.

In the neutral sulfite process for producing paper pulp, wood chips are treated in a digester at elevated temperatures and pressures with digestion liquor comprising primarily sodium sulfite solution with sodium carbonate as a buffer, and this process is well known to those skilled in the art. The concentration or strength of the cooking liquor and the operating conditions will vary depending upon such factors as the type of wood chips undergoing treatment, the type of pulp desired, and the specific process employed. After digestion is completed, the pulp is separated from the spent liquor and washed with a suitable washing agent, e.g., water, to recover any solids entrained in the pulp, and the pulp washings are combined with the spent liquor. The combined spent liquor and washings, commonly known as black liquor, contain practically all the inorganic compounds originally added together with organic matter extracted from the wood which may represent from one-third to one-fourth the original weight of wood.

In the preferred embodiment of treating the black liquor waste, as by pending application U.S. Ser. No. 459,267, now abandoned, the spent liquor or black liquor is concentrated by conventional evaporation procedures. This is preferably done in a one-step operation in vacuum, multiple-effect evaporators and the aqueous product discharge from the last effect has a concentration of about 30 to 35 percent by weight of total solids. The hot, concentrated liquor is then sprayed into a fluidized bed oxidation furnace operating with an oxidizing atmosphere, substantially as disclosed in the aforesaid pending United States application.

The inorganic sodium salts are discharged from the furnace bottom as a solid granular product. As explained above, the furnace operation is conducted in an oxidizing atmosphere, and therefore sodium sulfate is formed according to the stoichiometric equivalents of sodium and sulfur present in the waste liquor. In addition, in neutral sulfite pulping operations, the solid product includes sodium carbonate in intimate association. The solid product is passed to a countercurrent contacting column where it is dissolved in an aqueous solution of sodium sulfate and sodium carbonate, which is described hereinbelow in greater detail.

Reference is now made to FIGURE 2 showing in detail the separation and recovery of sodium sulfate and sodium carbonate from mixtures thereof.

There is passed to countercurrent contacting column 10 via line 12 an aqueous mixture comprising sodium sulfate and sodium carbonate, which is saturated with respect to sodium sulfate and unsaturated with respect to sodium carbonate. In this embodiment, the aqueous mixture is maintained at a temperature of 23° C., and for each 100 grams of water, there is dissolved therein about 21 grams of sodium sulfate and 10 grams of sodium carbonate. At a temperature of 23° C., the mutual solubilities for sodium sulfate is 21 grams and for sodium carbonate 24 grams. Because it is intended that the process preferably be cyclic, sodium bicarbonate is also present in solution, as will be made more clear hereinbelow. All, or a portion of the product from the fluidized bed oxidation furnace containing sodium carbonate and sodium sulfate is passed via line 14 to the countercurrent contacting column 10. The aqueous admixture in column 10 is saturated with respect to the sodium sulfate but not with respect to sodium carbonate. As a consequence, the sodium carbonate is selectively extracted from the admixture and goes into solution. The sodium sulfate residue settles out as a relatively pure product and is removed from the countercurrent contacting column via line 16. It is found that the sodium sulfate recovered will be substantially free of sodium bicarbonate, the solid product recovered usually being greater than 97 percent sodium sulfate.

The resulting aqueous mixture from the contacting column is passed via line 18 to the carbonation tower 20. The aqueous mixture passing to the carbonation tower and maintained at a temperature of 23° C. contains 21 grams of sodium sulfate, 24 grams of sodium carbonate as well as some sodium bicarbonate per 100 grams of water. Hence, the aqueous mixture is substantially saturated with respect to sodium sulfate and sodium carbonate. The operating conditions are closely controlled so that upon addition of the oxidation product to the aqueous mixture a saturated solution of sodium carbonate results so as to substantially avoid a sodium carbonate residue. When desired, the process may be operated at a less than saturated condition with respect to the sodium carbonate.

Carbon dioxide is pumped to the carbonation tower 20 through line 22, to treat the aqueous mixture. Substantially all the sodium carbonate present in the solution is converted to sodium bicarbonate, which is relatively insoluble and a majority precipitates from solution. The solubility of the sodium bicarbonate will vary slightly depending upon the temperature of the solution, and for the operating temperature range of this invention, not all the sodium bicarbonate precipitates from solution. The admixture including the precipitated sodium bicarbonate is passed to filter 24 to remove the sodium bicarbonate. A typical admixture passing from the carbonation tower comprises 21 grams of sodium sulfate and 10 grams of sodium bicarbonate per 100 grams of water and the precipitate of sodium bicarbonate. The clear solution from the filter is recycled via lines 26 and 12 to the countercurrent contacting column 10. The precipitate removed from filtrate 24 may then be dried in kiln 28 at a suitable drying temperature of from 200 to 250° F. to convert the sodium bicarbonate to sodium carbonate, and the carbon dioxide liberated is recycled via lines 30 and 22 to the carbonation tower 20. The recovered sodium carbonate may then be reused as a buffer chemical in the sulfite cooking liquor or converted to an active constituent thereof.

Having described our invention, and certain embodiments, we claim:

1. A method for the selective separation and recovery of sodium sulfate and sodium carbonate from an aqueous mixture thereof comprising forming an aqueous admixture saturated with respect to sodium sulfate and unsaturated with respect to sodium carbonate, contacting said aqueous admixture with a second admixture comprising sodium sulfate and sodium carbonate thereby selectively extracting the sodium carbonate from said second admixture and forming a solid residue of sodium sulfate, recovering said solid residue of sodium sulfate, carbonating the resulting solution to precipitate therefrom sodium bicarbonate, recovering the precipitated sodium bicarbonate and heating to convert to sodium carbonate, and recycling the solution saturated with respect to sodium sulfate to a subsequent extraction step, said aqueous admixture and solutions being maintained at a temperature of from about 10 to 35° C.

2. The method according to claim 1 wherein the temperature is from about 22 to 30° C.

3. In the process for the selective separation and recovery of sodium sulfate and sodium carbonate from the waste pulping liquor of the neutral sulfite pulping process wherein the waste liquor is passed to an oxidation furnace for recovering a product comprising sodium sulfate and sodium carbonate, the improvement comprising adding said product to an aqueous admixture saturated with respect to sodium sulfate and unsaturated with respect to sodium carbonate thereby selectively extracting from said product the sodium carbonate and forming a solid residue of sodium sulfate, recovering said solid residue of sodium sulfate, carbonating the resulting solution to precipitate therefrom sodium bicarbonate, recovering the precipitated sodium bicarbonate and heating said precipitate to convert to sodium carbonate, and recycling the solution saturated with respect to sodium sulfate to a subsequent extraction step for contacting with additional solid oxidation product, said aqueous admixture and solutions being maintained at a temperature of from about 10 to 35° C.

4. The process of claim 3 wherein said temperature is from about 22 to 30° C.

References Cited

UNITED STATES PATENTS

| | | | |
|---|---|---|---|
| 1,605,927 | 11/1926 | Drewsen | 23—48 |
| 1,836,426 | 12/1931 | Allen et al. | 23—121 |
| 1,869,621 | 8/1932 | Rosenstein et al. | 23—63 X |
| 2,309,569 | 1/1943 | Black et al. | 23—121 |
| 2,642,399 | 6/1953 | Aries et al. | 23—63 X |

MILTON WEISSMAN, *Primary Examiner.*

OSCAR R. VERTIZ, *Examiner.*

G. T. OZAKI, *Assistant Examiner.*